(12) United States Patent
Hank et al.

(10) Patent No.: US 7,594,223 B2
(45) Date of Patent: Sep. 22, 2009

(54) STRAIGHT-LINE POST-INCREMENT OPTIMIZATION FOR MEMORY ACCESS INSTRUCTIONS

(75) Inventors: Richard E. Hank, San Jose, CA (US); Le-Chun Wu, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 907 days.

(21) Appl. No.: 11/168,111

(22) Filed: Jun. 27, 2005

(65) Prior Publication Data

US 2006/0294510 A1     Dec. 28, 2006

(51) Int. Cl.
*G06F 9/45*    (2006.01)
*G06F 9/44*    (2006.01)

(52) U.S. Cl. .................. 717/151; 717/150; 717/160
(58) Field of Classification Search ......... 717/150–155, 717/148, 160, 161
See application file for complete search history.

(56) References Cited

U.S. PATENT DOCUMENTS

| | | | | |
|---|---|---|---|---|
| 5,287,510 | A  * | 2/1994 | Hall et al. ................... | 717/160 |
| 5,428,786 | A  * | 6/1995 | Sites .......................... | 717/151 |
| 6,151,705 | A    | 11/2000 | Santhanam | |
| 6,263,489 | B1 * | 7/2001 | Olsen et al. ................. | 717/129 |
| 6,286,135 | B1 * | 9/2001 | Santhanam ................. | 717/146 |
| 6,301,705 | B1 * | 10/2001 | Doshi et al. ................. | 717/154 |
| 6,381,740 | B1 * | 4/2002 | Miller et al. ................ | 717/151 |
| 6,539,541 | B1 * | 3/2003 | Geva .......................... | 717/150 |
| 6,748,589 | B1 * | 6/2004 | Johnson et al. ............. | 717/150 |
| 6,832,370 | B1 * | 12/2004 | Srinivasan et al. .......... | 717/161 |
| 6,954,923 | B1 * | 10/2005 | Yates et al. ................. | 717/130 |
| 6,986,131 | B2 * | 1/2006 | Thompson et al. .......... | 717/160 |
| 7,065,759 | B2 * | 6/2006 | Hank .......................... | 717/156 |
| 7,086,043 | B2 * | 8/2006 | Roediger et al. ............ | 717/150 |
| 7,143,403 | B2 * | 11/2006 | Hank .......................... | 717/159 |
| 7,200,841 | B2 * | 4/2007 | Lovett et al. ................ | 717/151 |
| 7,254,806 | B1 * | 8/2007 | Yates et al. ................. | 717/136 |
| 7,313,788 | B2 * | 12/2007 | Ben-David et al. .......... | 717/150 |
| 7,316,012 | B2 * | 1/2008 | Muthukumar ............... | 717/161 |

OTHER PUBLICATIONS

Pragaspathy et al, "Address partitioning in DSM clusters with Parallel Coherence Controllers", IEEE, pp. 47-56, 2000.*
Sjodin et al, "Storage allocation for embedded processors", ACM Cases, pp. 15-23, 2001.*
Hoover et al, "A case study of multi threading in the embedded space", ACM Cases, pp. 357-367, 2006.*
Panda et al, "Data and memory optimization techniques for embedded systems", ACM Daes, vol. 6, No. 2, pp. 149-206, 2001.*

* cited by examiner

*Primary Examiner*—Anil Khatri

(57) ABSTRACT

A compiler configured for optimizing non-loop memory access instructions of a computer program to form architected memory instructions conforming to a base register auto-incrementing addressing mode. The compiler includes code for obtaining an intermediate stream of code containing pseudo-memory instructions from the non-loop memory access instructions. The intermediate stream of code includes at least one place holder instruction preserving a value associated with a base of a first non-loop memory access instruction even after the first non-loop memory instruction is converted to one of the pseudo-memory instructions. The compiler includes code for converting the intermediate stream of code using the intermediate stream of code and the at least one place holder instruction to obtain the architected memory instructions.

23 Claims, 10 Drawing Sheets

| | |
|---|---|
| 102 | x=t+4 |
| 104 | ld a = [x] |
| 106 | y=t+8 |
| 108 | ld b = [y] |
| 110 | z=t+24 |
| 112 | ld c = [z] |

FIG. 1A

| | |
|---|---|
| 114 | x=t+4 |
| 116 | ld a = [x], 4 |
| 118 | ld b = [x], 16 |
| 120 | ld c = [x] |

FIG. 1B

330 ld x = [q]
332 add a = x+4
334 ld y = [a]
336 add b = t+4
338 add c = b+8
340 ld w = [c]
342 add d = t+4
344 ld e = [d]

Fig. 3B 346 ld x = [q]
348 add a = x+4
350 ld y = [a]
352 copy u = t
354 ld w = 12[u]
356 ld e = 8[u]

Fig. 3C

```
538    copy  u = t ;;
540    ld    a = 4[u] ;;
542    ld    b = 8[u]          ld    c = 12[u] ;;   //544
546    ld    d = 16[u] ;;
```

Fig. 5B

```
chain 1
538    copy  u = t
540    ld    a = 4[u]
```

Fig. 5C1

```
chain 1
538    copy  u = t
540    ld    a = 4[u]
542    ld    b = 8[u]
```

Fig. 5C2

```
chain 1                                chain 2
538    copy  u = t ;;                  ld    c = 12[u] ;;   //544
540    ld    a = 4[u] ;;
542    ld    b = 8[u]
```

Fig. 5C3

```
chain 1                                chain 2
538    copy  u = t ;;                  ld    c = 12[u] ;;   //544
540    ld    a = 4[u] ;;
542    ld    b = 8[u]
546    ld    d = 16[u] ;;
```

Fig. 5C4

Chain 1
622     copy u=t+4
624     ld a=[u],4
626     ld b=[u],8
628     ld d=[u]

Chain 2 add u1=t+12;;   //630
ld c=[u1];;     //632

Fig. 6B

STRAIGHT-LINE POST-INCREMENT OPTIMIZATION FOR MEMORY ACCESS INSTRUCTIONS

BACKGROUND OF THE INVENTION

The base register autoincrement addressing mode is implemented in modern processors and architectures, such as in the Intel Itanium™ family of processors and the HP PA-RISC™ architecture, to reduce the address computation overhead The reduction in overhead is achieved by arranging for a memory access instruction to modify its address register operand (through post-increment addressing mode) so that the modified address register value corresponds to the memory address used by a subsequent memory access instruction. By having the subsequent memory access instruction directly sourcing the post-incremented address register, an ALU (arithmetic logic unit) instruction that would otherwise be employed to set up the address for the memory access instruction is eliminated. Besides reducing resource contention, the base register autoincrement addressing mode has also proved to reduce potential instruction cache misses.

To facilitate discussion, FIG. 1A shows an example of six instructions that have been labeled with reference numbers 102, 104, 106, 108, 110, and 112. These reference numbers are not part of the program code; however, they are provided to improve clarity in the discussion. Instructions 102, 106, and 108 set up the address operands for load instructions 104, 108, and 110. In instruction 102, the value of register x is computed from a register t. This value x is then employed in load instruction 104 (representing an example memory access instruction) as the operand for the load instruction. Thus, instruction 104 "ld a=[x]" results in the contents of the memory location specified by register x being loaded into register a. Similarly, instruction 108 "ld b=[y]" results in the contents of the memory location specified by register y being loaded into register b. Likewise, instruction 112 "ld c=[z]" results in the contents of the memory location specified by register z being loaded into register c.

Notice, however, that instructions 102, 106, and 110 all compute their respective operands from a base register t. By converting instructions 102, 104, 106, 108, 110, and 112 to instructions conforming to the base register autoincrement addressing mode, the number of instructions employed to accomplish the operations specified by the sequence of instructions 102, 104, 106, 108, 110, and 112 is reduced, leading to improved execution efficiency.

FIG. 1B illustrates four instructions 114, 116, 118, and 120, representing instructions conforming to the base register autoincrement addressing mode and accomplishing the same operations as those specified in FIG. 1A. Instruction 114 is similar to instruction 102 in that instruction 114 sets up the operand x for the next memory access instruction that employs this operand value. Instruction 116 "ld a=[x], 4" is essentially similar to analogous instruction 104 with one important difference. In instruction 116, the ", 4" portion indicates that the value of x is incremented by 4 after the contents of the address location specified by operand x has been loaded into register a. This post-incrementing operation, which occurs in the same cycle as the load operation, eliminates the need to set up operand x again for the next load operation (e.g., load operation 118).

Note that instruction 116 accomplishes the same result as instructions 104 and 106 of FIG. 1A. This is because the operands of instructions 108 and 104 (i.e., y and x) are both derived from base register t and differ by 4 with respect to one another. By post-incrementing the operand x by 4 after load instruction 116, the operand x is set up for the next load instruction 118.

Similarly, note that instruction 118 accomplishes the same result as instructions 108 and 110 of FIG. 1A. This is because the operands of instructions 112 and 108 (i.e., z and y) are both derived from base register t and differ by 16 with respect to one another. By post-incrementing the operand x by 16 after load instruction 118, the operand x is set up for the next load instruction 120.

Load instruction 120 also conforms to the base register autoincrement addressing mode. However, since there are no subsequent memory access instructions that employ base register t in the calculation of the address operand, there is no need to autoincrement the value x after loading into register c. To put it another way, instruction 120 autoincrements the value x by zero.

Thus, the six instructions of FIG. 1A have been optimized and result in four instructions in FIG. 1B when the base register autoincrement addressing mode is employed. Note that the optimization is possible because the memory access instructions of FIG. 1A employ operands that are computed from the same base register t.

The above-discussed optimization may be performed by a human programmer when working with processors and architectures that support the base register autoincrement addressing mode. Such manual optimization is, however, tedious, time-consuming, error-prone, and susceptible to missed optimization opportunities whereby the programmer simply overlooks possible candidate instructions for optimization. In the software engineering process, automated code optimization (i.e., optimization performed by the computer) is therefore desirable. Such automated code optimization employs computer-implemented techniques capable of identifying candidate codes for optimization, as well as computer-implemented techniques for performing the optimization.

The inventors are aware that U.S. Pat. No. 6,151,705 issued to Santhanam on Nov. 21, 2000 (hereinafter "the '705 patent") discloses techniques for optimizing addressing instructions that occur in loops, e.g., for (i=1; i<8; i++), which memory address instructions specify an address that is a linear function of a loop induction variable (e.g., i). Further details may be obtained by reference to the '705 patent, which is publicly available.

To the inventors' best knowledge, however, there are no prior art techniques for automatically optimizing straight-line, non-inductive code such as those discussed in the example of FIG. 1A. This patent application is directed toward techniques for automating the optimization of straight-line, non-inductive code to take advantage of the efficiency offered by the base register autoincrement addressing mode.

SUMMARY OF INVENTION

The invention relates, in an embodiment, to a computer-implemented method for performing compiler straight-line post-increment (SLPI) optimization for memory access instructions of a computer program. The method includes performing SLPI preparation on candidate memory access instructions to obtain an intermediate stream of code containing pseudo-memory instructions. Each of the candidate memory access instructions represents a non-loop memory access instruction and employs an address that is computed based on the same base register shared by another instruction of the candidate memory access instructions. The computer-implemented method further includes performing SLPI synthesis on the intermediate stream of code to obtain architected memory instructions conforming to a base register auto-incrementing addressing mode.

In another embodiment, the invention relates to an article of manufacture comprising a program storage medium having computer readable code embodied therein, the computer readable code being configured for performing compiler straight-line post-increment (SLPI) optimization for memory access instructions of a computer program. The article of manufacture includes computer readable code for performing SLPI preparation on candidate memory access instructions to obtain an intermediate stream of code containing pseudo-memory instructions, each of the candidate memory access instructions representing a non-loop memory access instruction and employing an address that is computed based on the same base register shared by another instruction of the candidate memory access instructions. The article of manufacture also includes computer readable code for performing SLPI synthesis on the intermediate stream of code to obtain architected memory instructions conforming to a base register auto-incrementing addressing mode.

In yet another embodiment, the invention relates to a compiler configured for optimizing non-loop memory access instructions of a computer program to form architected memory instructions conforming to a base register auto-incrementing addressing mode. The compiler includes code for obtaining an intermediate stream of code containing pseudo-memory instructions from the non-loop memory access instructions. Each of the pseudo-memory instructions sources a different base than a respective base of a respective non-loop memory access instruction of the non-loop memory access instructions. The intermediate stream of code includes at least one place holder instruction preserving a value associated with a base of a first non-loop memory access instruction even after the first non-loop memory instruction is converted to one of the pseudo-memory instructions. The compiler includes code for converting the intermediate stream of code using the intermediate stream of code and the at least one place holder instruction to obtain the architected memory instructions.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A shows an example of six prior art non-optimized memory access instructions.

FIG. 1B illustrates four optimized memory access instructions, representing instructions conforming to the base register autoincrement addressing mode and accomplishing the same operations as those specified in FIG. 1A.

FIG. 3B shows in more detail, in accordance with an embodiment of the invention, the steps for implementing SLPI preparation.

FIG. 3C shows, in accordance with an embodiment, the intermediate stream of code that is created after the preparation phase using the steps of FIG. 3A and the instructions of FIG. 3B.

FIG. 5B shows five scheduled instructions to facilitate discussion of the operation of the steps of FIG. 5A.

FIGS. 5C1, 5C2, 5C3, and 5C4 show the chains that are created from FIG. 5B using the steps of FIG. 5A.

FIG. 6B shows, in accordance with an embodiment, the result when the steps of FIG. 6A are applied to the example of FIG. 5C4.

DETAILED DESCRIPTION OF VARIOUS EMBODIMENTS

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention also covers articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention also covers apparatuses for practicing embodiments of the invention. Such apparatus may include circuits, dedicated and/or programmable, to carry out tasks pertaining to embodiments of the invention. Examples of such apparatus include a general purpose computer and/or a dedicated computing device when appropriately programmed and may include a combination of a computer/computing device and dedicated/programmable circuits adapted for the various tasks pertaining to embodiments of the invention. Examples of such apparatus may include appropriate dedicated and/or programmable circuitry in one or more integrated circuits configured to carry out the computer-implemented techniques disclosed herein.

Figure 2A:
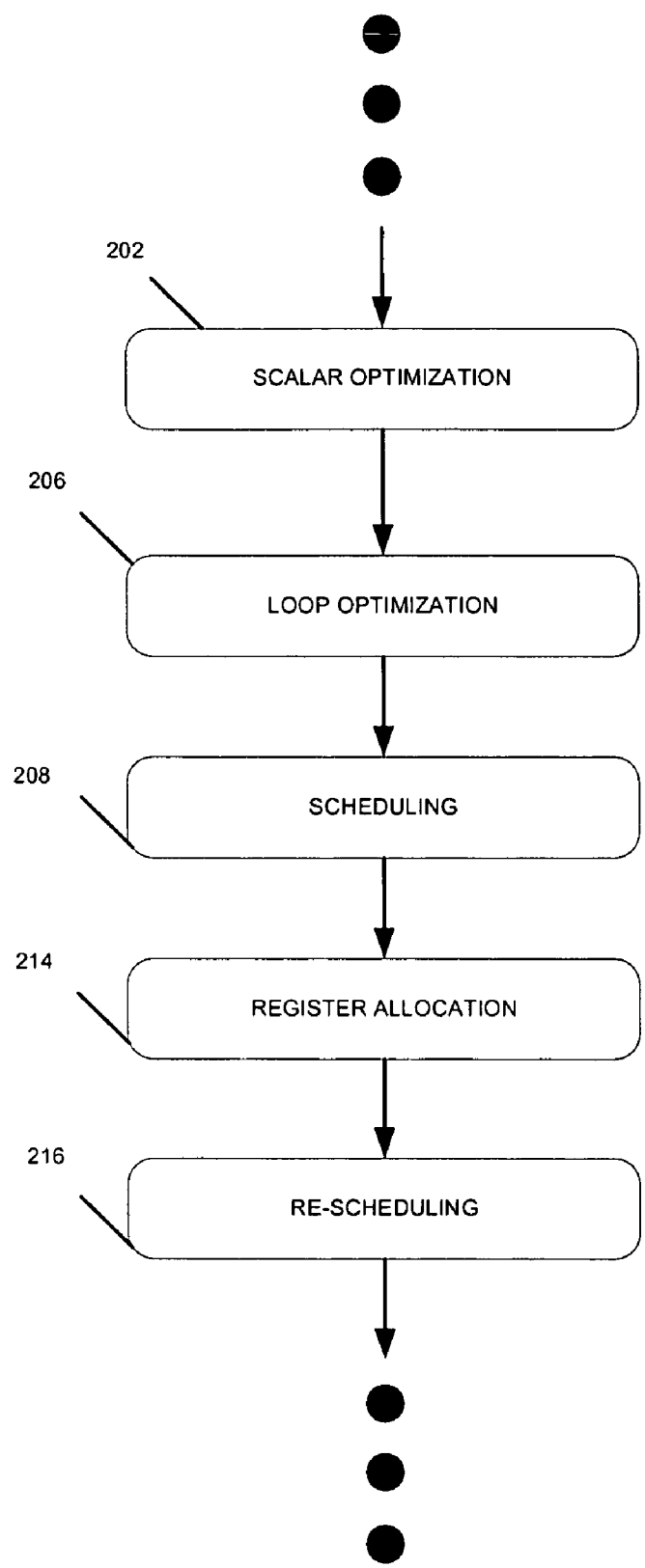
FIG. 2A shows a prior art example of a generic compiler phase ordering.

As discussed, embodiments of the invention perform the straight-line post-increment (SLPI) optimization in two steps: a SLPI preparation step and a SLPI synthesis step. FIG. 2A shows a prior art example of a generic compiler phase ordering. As compilers are decades-old art and each phase in FIG. 2A is well-known to those skilled in the art, a detailed discussion pertaining to well-known compiler phases such as those described in FIG. 2A will not be undertaken here.

In step 202, scalar optimization is performed. Compiler scalar optimization is well known to those skilled in the art. In step 206, loop optimization, such as that described in the '705 patent, is performed. As discussed, the '705 patent optimizes instructions computing memory addresses that occur in loops when the computed memory address is a linear function of a loop induction variable.

The instruction scheduling phase occur in step 208. Thereafter, register allocation is performed in step 214. Re-scheduling is then performed in step 216. Although the phases of prior art FIG. 2A are well-known to those skilled in the art, the relative ordering of the phases in FIG. 2A may vary according to compiler implementations. Accordingly, the relative ordering of the compiler phases of FIG. 2A is illustrative and not limiting of the scope of the invention.

Figure 2B:
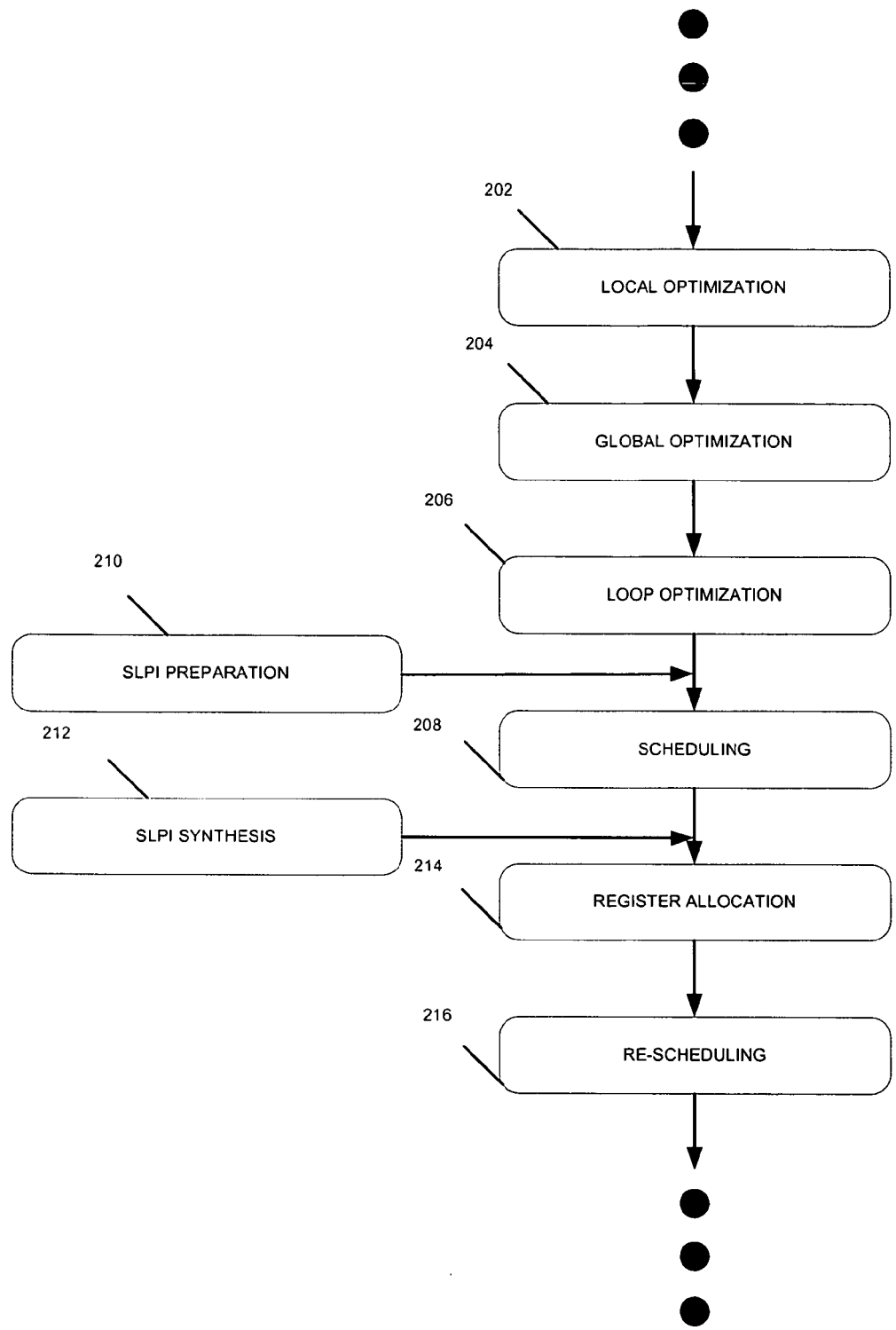
FIG. 2B illustrates, in accordance with an embodiment of the invention, the ordering of the SLPI preparation step and the SLPI synthesis step relative to the compiler phases of FIG. 2A.

FIG. 2B illustrates, in accordance with an embodiment of the invention, the ordering of a SLPI preparation step 210 and a SLPI synthesis step 212 relative to the compiler phases of FIG. 2A. As shown in the embodiment of FIG. 2B, the SLPI preparation step occurs before scheduling step 208, and SLPI synthesis step 212 occurs after scheduling step 208. However, it should be noted that both the SLPI preparation step and the SLPI synthesis step may occur before or after the scheduling step. In an embodiment, both the SLPI preparation step and the SLPI synthesis step occur before the register allocation step.

Figure 3A:
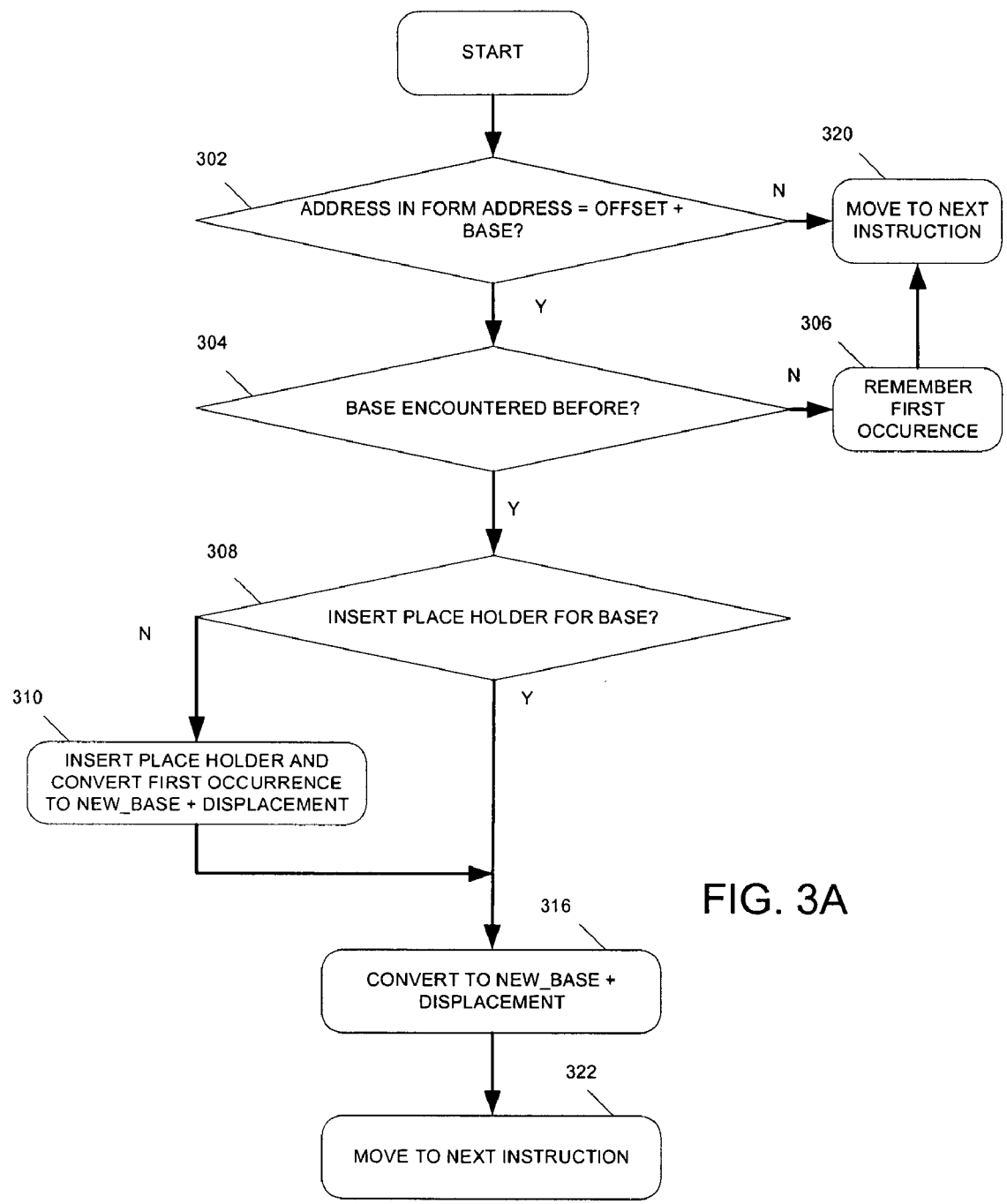
FIG. 3A shows, in accordance with an embodiment of the invention, the steps for implementing SLPI preparation.

FIG. 3A shows, in accordance with an embodiment of the invention, the steps for implementing SLPI preparation. In the SLPI preparation step, straight-line, non-inductive memory access instructions that are candidates for optimization are identified (302). A memory access instruction is considered a SLPI candidate if there is at least another memory access instruction whose address computation is based on, either directly or indirectly, the same base register. Further, candidates that share the same base register are converted to pseudo-memory instructions sourcing a new base. The pseudo-memory instructions associated with the same base register are in the form new_base+displacement (316). To preserve the value of the old base register and to create a place holder for future initial address calculation during the synthesis step (to be discussed later herein), the value of the original (old) base register is copied into the new base (310). The result is an intermediate stream of code containing pseudo-memory instructions that can be employed during the SLPI synthesis step to create optimized code.

FIG. 3B shows in more detail, in accordance with an embodiment of the invention, the steps for implementing SLPI preparation. As mentioned, it is desirable in the preparation phase to create a stream of code containing pseudo-memory instructions in place of the candidate straight-line memory access instructions, which pseudo-memory instructions are employed during the SLPI synthesis phase to create optimized code. FIG. 3B is applied to each straight-line (e.g., non-loop) memory access instruction. In performing the steps of FIG. 3B, each straight-line memory access instruction (e.g., load, store, prefetch, etc.) is examined to determine whether it is a candidate for SLPI optimization.

Thus, in step 302, the address of the memory access instruction under examination is analyzed to determine whether it is in the form of "address=base+n" (where n is some arbitrary value representing, for example, an offset or an index). With reference to FIG. 3B, for example, addresses a and c of memory access instructions 334 and 340 (the reference numbers 334 and 340, as well as other references in FIG. 3B, are added to clarify the discussion) are both in the form of "address=base+n" since a is equal to x+4 (shown by reference number 332), and c is equal to b+8 (shown by reference number 338).

If the address of the straight-line memory access instruction is not in the form of "address=base+n", optimization is not possible, and the examination of the preparation phase moves on to the next straight-line memory access instruction (step 320). On the other hand, if the address of the straight-line memory access instruction is in the form of "address=base+n", an inquiry is made in step 304 to ascertain whether the current base has been previously encountered in a previously examined straight-line memory access instruction. In performing step 304, recognizing that a base may be defined in term of other intermediate bases, back substitution may be made for a base until no more back substitution is possible.

With reference to FIG. 3B, base c in instruction 340 is defined in terms of base b (instruction 338). Base b is in turn defined by base t (instruction 336). In performing the inquiry of FIG. 3B, back substitution may be made back to base t (i.e., to the point where no more substitution is possible since base t is not defined by any other base in FIG. 3B) to resolve base c relative to base t (i.e., c=t+4+8 or c=t+12). Back substitution increases the chance that candidates sharing the same base (e.g., t) can be identified irrespective whether that candidate (e.g., instruction 340 which loads the content of "c" into "w") defines its address in terms of an intermediate base (such as "c").

Algorithmically speaking, back substitution may be performed in an embodiment by first identifying whether the current instruction is in the "add-immediate" form. The "add-immediate" operation is an arithmetic operation that adds a constant to a register. Starting from the instruction that defines the address, if the instruction is an add-immediate instruction (e.g., x=c1+y) and the instruction that defines the register (e.g., y) is also an add-immediate instruction (e.g., y=c2+z), where both c1 and c2 are constants, the substitution involves replacing y with z and adding c2 to c1. Thus, the back-substituted instruction becomes x=c1+c2+z. The process continues until no more substitution is possible. When no more substitution is possible, the "immediate" part of the back-substituted address (e.g., c1+c2) becomes the new offset of the address while the register becomes the base register (e.g., z).

If the base has not been encountered previously, this first occurrence is remembered (step 306) in case another straight-line memory access instruction later references the same base. On the other hand, if this base has already been encountered at least once (as ascertained in step 304), an inquiry is made to ascertain whether a place holder instruction has been inserted into the intermediate stream of code for this base.

As will be made clear later in the examples of FIGS. 3B and 3C, the place holder instruction preserves the original value of the old base, thereby making it safe to represent the candidate instruction in the form of "address=new_base+displacement". The place holder instruction also represents the location in the sequence of instructions where the initial address calculation will be made during SLPI synthesis for pseudo-memory instructions sourcing the same base register. In an embodiment, the place holder instruction is inserted into the place in the intermediate stream of code that is dominated by the definition of the old base register (i.e., the definition of the old base register executes before the place holder instruction) and dominates all candidate memory instructions that references, directly or indirectly, the old base register (i.e., the place holder instruction executes before all candidate memory instructions that references, directly or indirectly, the old base register).

If the place holder instruction has not been inserted for the current base, the value of the old base is copied onto a new base, which copy operation is inserted into the intermediate stream of code as the place holder instruction (310). Furthermore, the first occurrence of the memory instruction that sources this base is converted to a pseudo-memory instruction that has the format of "new_base+displacement". Thereafter, the process proceeds from step 310 to step 316 wherein the current instruction is converted to the pseudo-memory instruction format. Thereafter, the next instruction is examined (322).

On the other hand, if the place holder instruction has already been inserted for the current base (step 308), the process proceeds to step 316 wherein the current instruction is converted to the pseudo-memory instruction format. Thereafter, the next instruction is examined (322).

Thus, the effect of steps 308 and 310 is to ensure that if the current memory access instruction shares, either directly or indirectly, the same base register as a previously encountered memory access instruction, a place holder instruction is inserted (step 310) into the intermediate stream of code (which contains the pseudo-memory instructions to be forwarded to the SLPI synthesis phase), and the first occurrence of the memory instruction that shares the same base register is converted (step 310) into a pseudo-memory instruction. Once these operations occur, the current memory instruction is then converted into a pseudo-memory instruction. This sequence of steps ensures that unless a second memory instruction that shares the same base register is encountered, the first memory instruction is not converted to a pseudo-memory instruction unnecessarily (since no optimization is possible unless at least two instructions share the same base register).

FIG. 3B shows a code fragment containing memory access instructions that are employed to illustrate the steps of FIG. 3A. Reference numbers 330, 332, 334, 336, 338, 340, 342, and 344 have been added to FIG. 3B to clarify the discussion.

To illustrate with reference to FIG. 3A, the inquiry at step 302 for the first memory instruction examined (i.e., memory instruction 334 of FIG. 3B) will return an affirmative response (since a=x+4). The inquiry at step 304 will be a negative (since base x has not been encountered previously in any other previously examined straight-line memory access instructions). Thus, according to step 320, this first memory instruction that references base x is remembered and the next memory access instruction is examined.

The next memory instruction is memory instruction 340 of FIG. 3B. The inquiry at step 320 for memory instruction 340 of FIG. 3B will return an affirmative response (since c=b+8). Further, back-substitution reveals that c can be represented as t+12 (by back-substituting with instructions 336 and 338). The inquiry at step 304 will be a negative (since base t has not been encountered previously in any other previously examined straight-line memory access instructions). Thus, according to step 320, this first memory instruction that references base t is remembered and the next memory access instruction is examined.

The next memory instruction is memory instruction 344 of FIG. 3B. The inquiry at step 320 for memory instruction 344 of FIG. 3B will return an affirmative response (since d=t+4). The inquiry at step 304 will be a positive (since base t has been encountered previously when examining memory instruction 340). Thus, the method proceeds to step 308 to determine whether a place holder instruction has been placed into the intermediate stream of code.

The inquiry at step 308 will be a negative (since no place holder instruction for base t has been placed into the intermediate stream of code). Thus, the method proceeds to insert (according to step 310) the place holder instruction "copy u=t" into the intermediate stream of code, where u is the new base for the pseudo-memory instruction and t is the old base. Further, the first occurrence of the memory instruction that references base t, i.e., memory instruction 340 of FIG. 3B, is converted to a pseudo-memory instruction. Then in step 316, the current memory instruction (i.e., memory instruction 344 of FIG. 3B) is converted to a pseudo-memory instruction. Thereafter, the next instruction is examined (322).

FIG. 3C shows the intermediate stream of code that is created after the preparation phase using the steps of FIG. 3A and the instructions of FIG. 3B. In FIG. 3C, memory instruction 334 (load the contents of address a into register y) does not share, directly, or indirectly, a base register with any other memory access instruction. Accordingly, instructions 330, 332, and 334 are not optimizable and are placed into the intermediate stream of code without modification (as shown by respective reference numbers 346, 348, and 350 in FIG. 3C).

Memory instructions 340 and 344 share a base register t, as discussed above. Accordingly, a place holder instruction 352 is inserted into the intermediate stream of code. The first occurrence of the memory instruction that references base t is converted first into a pseudo-memory instruction, resulting in instruction 354 (load the content of the memory location that is referenced by the value u+12 into w). Then memory instruction 344 is converted pseudo-memory instruction 356 (load the content of the memory location that is referenced by the value u+8 into e).

After the preparation phase, SLPI synthesis takes place. In SLPI synthesis, each pseudo-memory instruction is examined and then placed on a list (referred to herein as "post-increment chain") based on whether any previously examined pseudo-memory instruction that shares the same base register can set up its address through post-increment. It is desirable to create as few chains as possible for all the pseudo-memory instructions since each new chain requires computation overhead in addressing setup.

Once all the pseudo-memory instructions are examined, they are then converted to architected memory instructions (i.e., optimized instructions conforming to instruction specifications for the processor architecture and/or platform) such that each of them would post-increment its address register to set up the address for the subsequent instruction in the chain. The instructions on the same chain would share the same address register after SLPI synthesis is completed. During SLPI synthesis, instructions to initialize the address registers of the chains may be created.

In discussing the SLPI synthesis step, the following definitions are employed. A post-increment chain refers to a list of pseudo-memory instructions that share the same base register. Each instruction on a chain sets up the address for its immediate succeeding instruction through post-increment after synthesis is done. As can be seen in the examples later herein, it is not required that all memory access instructions that share the same base register in a given program belong to a single post-increment chain. A post-increment tree refers to a collection of post-increment chains that share the same final address register. A post-increment chain may be thought of as a degenerate tree, i.e., a chain with no branches. An address calculation that initializes the final address register is performed for each tree. A chain tail refers to the last instruction of a post-increment chain.

SLPI synthesis involves building post-increment chains and transforming the pseudo-memory instructions in the chains to architected memory instructions employing the base register autoincrementing addressing mode. In building post-increment chains, each pseudo-memory instruction is examined to determined whether that memory instruction can 1) mate with an existing chain, or 2) mate with two or more existing chains, or 3) branch out of an existing chain. If no chain can be found to mate with the pseudo-memory instruction under examination and no branching is possible, a new post-increment chain is created. If the newly created chain cannot branch out of an existing chain, a new post-increment tree is then created.

Figure 4:
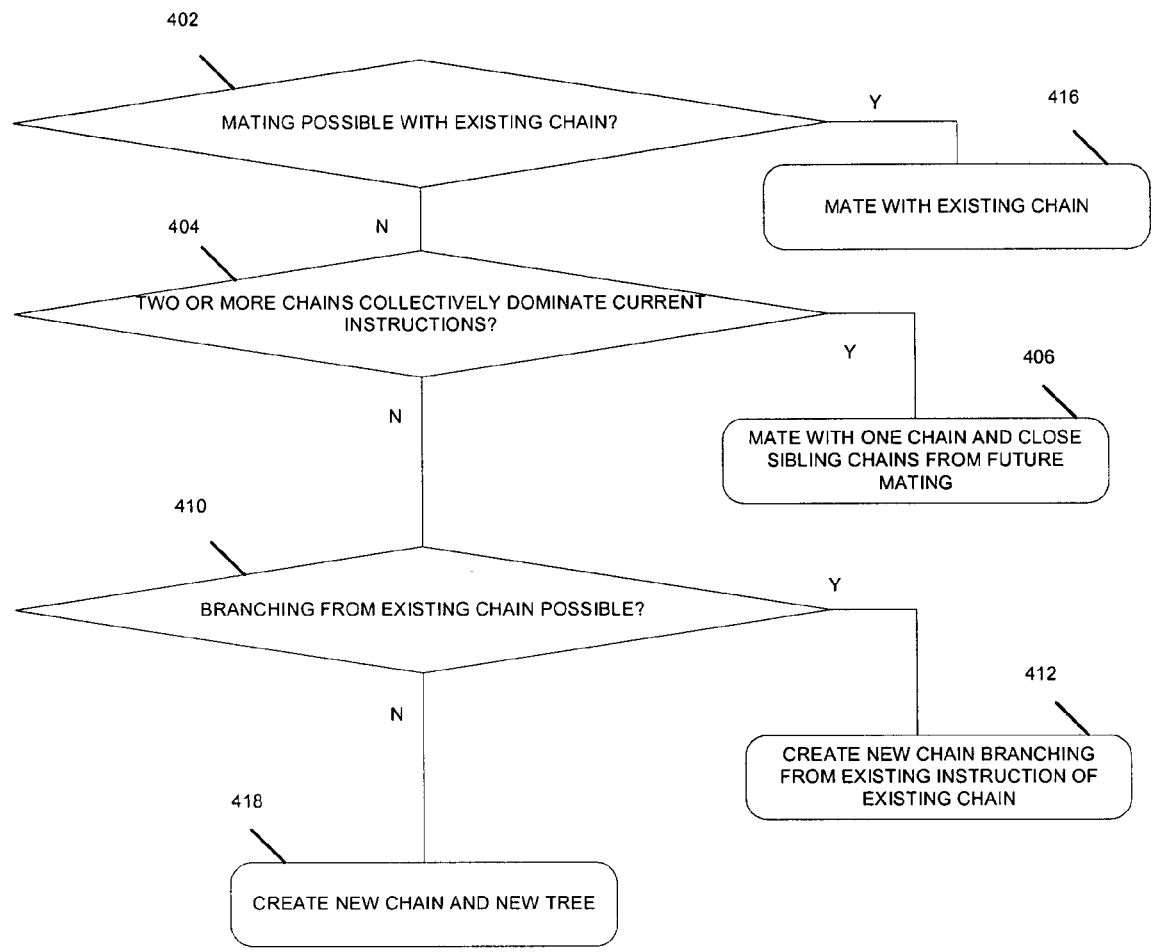
FIG. 4 shows, in accordance with an embodiment of the present invention, the steps for performing SLPI synthesis of an intermediate stream of code.

FIG. 4 shows, in accordance with an embodiment of the present invention, the steps for performing SLPI synthesis of an intermediate stream of code. In building post-increment chains, pseudo-memory instructions are visited in frequency-based topological order in an embodiment. Conceptually speaking, a procedure of a program for example may be viewed as a graph of nodes, with each node representing a block of code (one or more instructions). When an instruction within a node is visited, all instructions associated with predecessor nodes have been visited. Since different topological orderings are possible for a given graph, the topological ordering employed is produced using execution frequency data in an embodiment. This execution frequency data may be obtained from, for example, runtime profile feedback data (such as edge frequency or execution frequency of the codes) that is routinely obtained from modern compilers. Using a frequency-based topological order to visit the pseudo-memory instructions ensures that instructions that execute more frequently are given priority in mating with existing chains, thereby lessening the likelihood of having to insert an address initialization instruction for a frequency executed memory address instruction.

For each pseudo-memory instruction examined, existing post-increment chains with the same base register as the pseudo-memory instruction under examination are analyzed to determine whether any of them can "mate" with the pseudo-memory instruction under examination (step 402).

A post-increment chain is said to be able to "mate" with a given pseudo-memory instruction if the chain tail dominates (i.e., executes before) the memory instruction and the cycle count distance between these two instructions (in the instruction schedule) is greater than the architected latency time specification (as there would be a dependency between the two instructions due to post-incremented address register after transformation). If an existing chain is able to mate with the pseudo-memory instruction being examined, mating occurs (416). If no existing chain can be found to mate with the pseudo-memory instruction under examination, a branch occurs (412), resulting in a post-increment tree, or a new chain is created (418).

However, before a new chain is created, an inquiry is made as to whether there is a post-increment tree in which all chain tails that can reach the pseudo-memory instruction dominate the memory instruction collectively. If there is a post-increment tree in which all chain tails that can reach the pseudo-memory instruction dominate the memory instruction collectively, the pseudo-memory instruction would "mate" with all the reaching chains (404). When a pseudo-memory instruction mates with more than one chain, all but one of the chains would be closed so that they will not be considered for future mating (406). By allowing only one chain to remain open, the potentially troublesome situation wherein the pseudo-memory instruction (now becoming the chain tails of the multiple chains it mated with) mate with two (or more) subsequent instructions that have different offsets is advantageously avoided.

In creating a new chain for the pseudo-memory instruction, efforts are made to ascertain if the new chain can branch out of an existing chain with the same base register (410). The benefit of doing so is that address initialization may be unnecessary for a chain that branches out of an existing chain. When a newly-created chain branches out of an existing chain, both the new chain and the existing chain are in the same post-increment tree, which means the instructions on both chains share the same address register (once SLPI synthesis is completed) and no address initialization instruction is created for the branched chain. On the other hand, if the new chain cannot grow out of an existing chain, a new chain may be created and an additional address calculation instruction is employed.

To determine if branching out of an existing chain is possible, and if so, to identify the branching point, instructions on the chain (except for the tail) are visited in reverse order (i.e., starting from the tail). If an instruction in the chain that is visited satisfies the following conditions: a) it dominates the pseudo-memory instruction, b) it is not post-dominated by its immediate successor on the chain, and c) its immediate successor has the same offset as the pseudo-memory instruction. If all three conditions are satisfied, the new chain is created branching out of this instruction (412).

If no chain can be found to mate with the pseudo-memory instruction under examination and no branching is possible, a new post-increment chain is created (step 418).

Once the post-increment chains are created, the pseudo-memory instructions are transformed into architected memory instructions employing the base register autoincrementing addressing mode with proper post-increment amounts. Except for the chain tails, each pseudo-memory instruction is converted to an architected memory instruction with a post-increment amount that is the difference between its offset and the offset of its immediately succeeding instruction in the chain. The post-increment amount for the chain tail is zero. For each post-increment tree, an address calculation instruction is created to initialize the address register of the first memory instruction in the tree.

As mentioned earlier, in the SLPI preparation phase, a place holder instruction such as the copy instruction is inserted for each base register. The copy instruction is then used in the SLPI synthesis step to initialize the address register for a tree by being converted to an add instruction. The target register of the copy instruction would become the address register for the instructions for the tree.

For example, if the place holder instruction is "a=t", and the post-increment chain contains the following pseudo-memory instructions: "1d x=8[a]" and "1d y=16[a]" and "1d z=24[a]", the transformation would result in "add a=t+8" and "1d x=[a], 8", "1d y=[a], 8" and "1d z=[a]". The place holder instruction is converted into an add instruction that sets up the address for the next load instruction. Subsequent instructions are in the example architected memory instructions conforming to the base register autoincrementing addressing mode.

However, when there is more than one tree that shares the same base register, only the tree that was processed first gets to use the palace holder instruction. Address calculation instructions may be created to initialize the address registers of other trees. In an embodiment, for a tree in which all of its pseudo memory instructions have the same offset, if the initial address is available in some register and the definition of that register dominates the first memory instruction of the tree, the register may be employed as the address register for the tree without having to create an address initialization instruction. Even though there may be other consumers of this particular register, since all pseudo-memory instructions in the tree have the same offset, no post-increment will happen among these memory instructions and therefore the register value will not be destroyed.

Figure 5A:
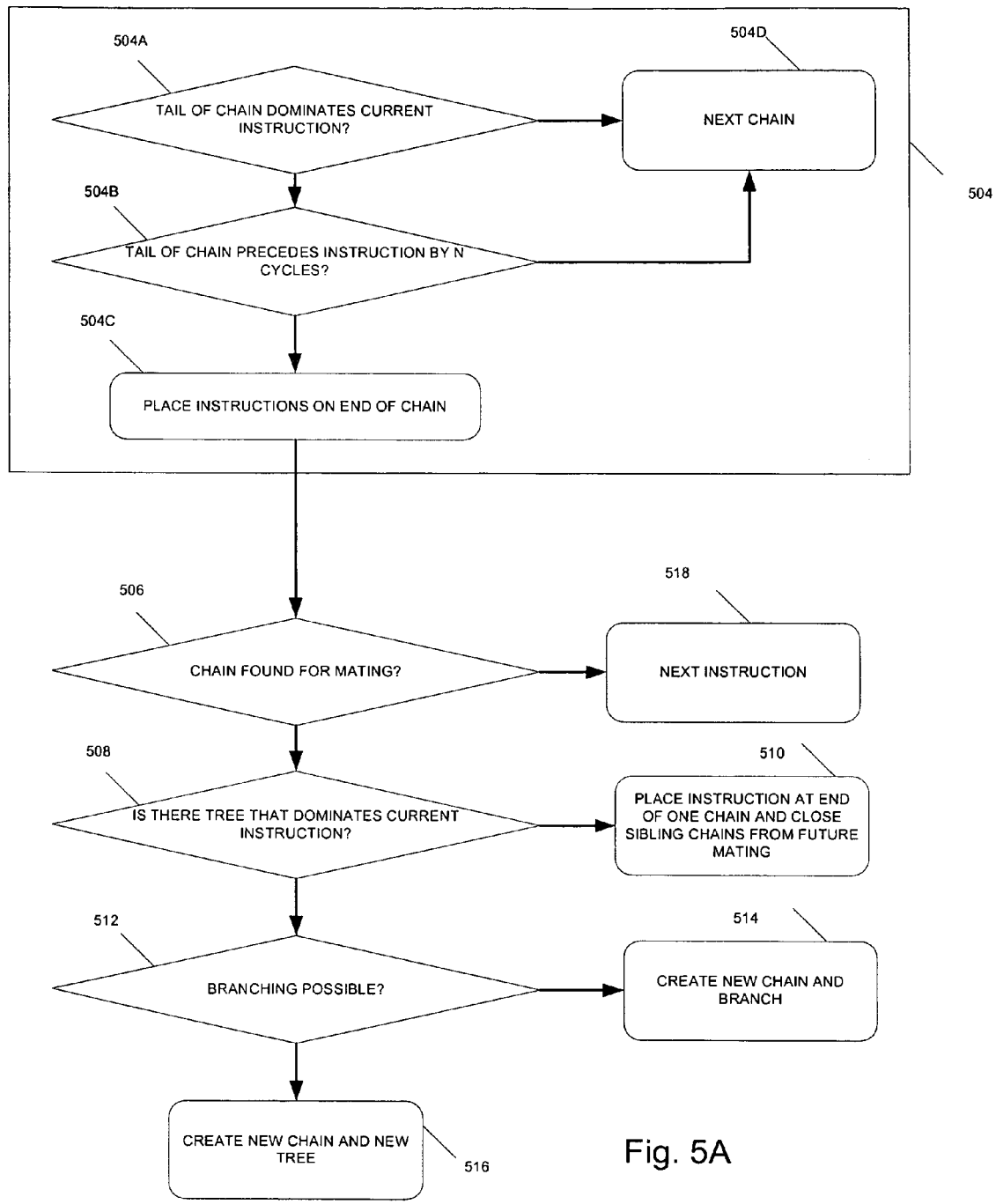
FIG. 5A illustrates a more detailed flow chart, in accordance with an embodiment of the present invention, of the steps involved in the post-increment chain building step.

FIG. 5A illustrates a more detailed flow chart, in accordance with an embodiment of the present invention, of the steps involved in the post-increment chain building step. For each pseudo-memory instruction in the form "base+displacement" (e.g., "1d w=12[u]") that is examined, the chains are analyzed to determine whether mating is possible or whether a new chain will be employed (step 504).

For each chain sharing the same base register as the base register of the pseudo-memory instruction currently being examined, the analysis of steps 504A and 504B are undertaken. In step 504A, an inquiry is made regarding whether the instruction currently at the tail of the chain dominates (executes before) the pseudo-memory instruction currently being examined. If the answer is in the negative, then that chain fails as a candidate chain for mating and the next chain is examined (504D). This is because if the instruction at the tail of the chain can be bypassed during execution, that instruction cannot be relied upon to set up the operand for the address in the instruction currently under examination.

On the other hand, if the instruction currently at the tail of the chain dominates the pseudo-memory instruction currently being examined, a further inquiry is made in step 504B to determine whether the instruction currently at the tail of the chain precedes the pseudo-memory instruction by at least n cycles, whereby n is the minimum number of cycles required for the post-incremented value of the instruction at the tail of the chain to be ready for use as the address operand in the current instruction. This value n is dependent upon processor design and may vary between 1 and any positive integer. If the instruction currently at the tail of the chain does not precede the pseudo-memory instruction by at least n cycles, that chain fails as a candidate chain for mating and the process moves on to the next chain. In an embodiment where the synthesis phase is performed prior to instruction scheduling, the condition of step 504B may not be necessary.

On the other hand, if the instruction currently at the tail of the chain precedes the pseudo-memory instruction by at least n cycles, the instruction is placed at the end of that chain as the new chain tail and the process of substep 504 ends (i.e., the process of examining all chains for possible mating ends).

In step 506, an inquiry is made whether a chain is found for mating. If a chain has been found for mating, the pseudo-memory instruction has been successfully mated with an existing chain and the method proceeds to examine the next pseudo-memory instruction (step 518).

If no chain is found for mating (e.g., there exist no chains that share the same base register or there exist no chains that satisfy both tests of steps 504A and 504B), the process next proceeds to step 508 to ascertain whether there exists a tree (i.e., multiple chains) that collectively dominate the pseudo-memory instruction currently under examination. For example, two chain tails may execute two alternative conditions of an if-then-else statement. Since neither of these chain tails satisfies the test of step 504A, neither can alone satisfies all conditions to allow it to mate with the current instruction. However, since both chain tails cover all alternatives of the if-then-else instruction and dominate the current pseudo-memory instruction in this case, both can mate with the current pseudo-memory instruction.

In this case, one of the chains that collectively dominate the current pseudo-memory instruction is mated (step 510) with the current pseudo-memory instruction, and all other chains that collectively dominate it are closed (i.e., not allowed to mate in the future). In other words, after this mating is completed, only one chain from all the chains that collectively dominate the current pseudo-memory instruction remains open for mating.

If there exists no collection of chains that dominate the pseudo-memory instruction, another inquiry may be made in step 512 to ascertain whether branching is possible. To determine if branching out of an existing chain is possible, and if so, to identify the branching point, instructions on the chain (except for the tail) are visited in reverse order (i.e., starting from the tail). If an instruction of the chain that is visited satisfies the following conditions: a) it dominates the pseudo-memory instruction, b) it is not post-dominated by its immediate successor on the chain, and c) its immediate successor has the same offset as the pseudo-memory instruction. If all three conditions are satisfied, the new chain is created branching out of this instruction (514).

Consider for example a chain having the following four memory access instructions in a chain "1d w=d0[b]", "1d x=d1[b]", "1d z=d2[b]", "1d u=d3[b]", where d0, d1, d2, and d3 are integers. In examining an pseudo-memory instruction "1d y=d2[b]", it is noted that by looking at the instructions of the chain in reverse order, the pseudo-memory instruction "1d x=d1[b]" satisfies all conditions: it dominates the current instruction, it is not post-dominated by its immediate successor in the chain "1d z=d2[b]", and the immediate post successor in the chain "1d z=d2[b] has the same offset as the current instruction (i.e., d2). In this case, the new chain can branch from the existing chain, and instruction "1d x=d1[b]" can post-increment its address registers to set up the address for both instructions "1d y=d2[b]" and "1d z=d2[b]" after SLPI synthesis is completed.

If branching is not possible (per step 512), a new chain is created (step 516).

FIG. 5B shows five scheduled instructions (538, 540, 542, 544, and 546), including pseudo-memory instructions (540, 542, 544, and 546), that are scheduled over four cycles, with memory instructions 542 and 544 sharing the same cycle. The instructions of FIG. 5B are employed to illustrate the operation of the steps of FIG. 5A. The convention ";" is employed in the figures herein to delineate the end of an instruction cycle.

FIGS. 5C1, 5C2, 5C3, and 5C4 show the chains that are created from FIG. 5B using the steps of FIG. 5A. For the first pseudo-memory instruction 540 "1d a=4[u]", no chain exists prior to its examination. Accordingly, the test in step 504A, 504B, 506, 508, and 512 of FIG. 5A fail. The result is shown in FIG. 5C1 wherein a single chain is built with the first instruction 540.

The next pseudo-instruction 542 "1d b=8[u]" is then examined. For this instruction 542, the tests of 504A results in the affirmative since there exists chain 1 sharing the base u, and instruction 540 trivially dominates instruction 542 in the chain of straight-line instructions. Assuming for the purpose of discussing FIG. 5A that the processor requires that there be at least 1 instruction cycle before the post-addressing of one instruction can be employed for addressing purpose by the next instruction, the test of step 504b also results in the affirmative because there is at least one instruction that separates instruction 542 from instruction 540. Accordingly, the method proceeds to step 504c, wherein the current instruction 542 is placed at the end of chain 1. This placement of the current instruction at the end of chain 1 concludes step 504, i.e., the examination of all existing chains that share the same base register for possible mating.

The test of step 506 results in an affirmative, and the method proceeds to step 518 to examine the next instruction 544 ("1d c=12[u]"). The result after step 518 is shown in FIG. 5C2.

For instruction 544, there exists chain 1 that shares the same base register u. The test of step 504B results in the affirmative (due to the trivial dominating nature of these straight-line instructions). However, the test of step 504B results in a negative since instruction 544 is scheduled to execute in the same cycle as instruction 542 (i.e., the current chain tail), and the processor specification requires that there be at least one cycle that separates these two instructions. Accordingly, chain 1 fails as a candidate for mating, and the method proceeds to examine the next chain (of which there is none).

Since there are no more chains to examine, step 504 is finished and in the next step 506, the test results in a negative response since no chain for mating has been found. Thus, the method proceeds to step 508, wherein the answer is also negative (i.e., there are no multiple chains that collectively dominate the current instruction). Test 512 also fails (i.e., no branching off an existing chain is possible). Accordingly, instruction 544 is placed on a new chain, as shown in FIG. 5C3.

For the next instruction to be examined 546 ("1d=16[u]"), there are two chains that share the base register u and are possible candidate chains for mating with the current instruction. An examination of chain 1 in step 504 yields affirmative responses in both steps 504a and 504b. Accordingly, the method proceeds to step 504c, wherein the current instruction 546 is placed at the end of chain 1. This placement of the current instruction at the end of chain 1 concludes step 504, i.e., the examination of all existing chains that share the same base register for possible mating.

The test of step 506 results in an affirmative, and the method proceeds to step 518 to examine the next instruction (of which there is none in the current example). The result of the chain building process is shown in FIG. 5C4.

Figure 6A:
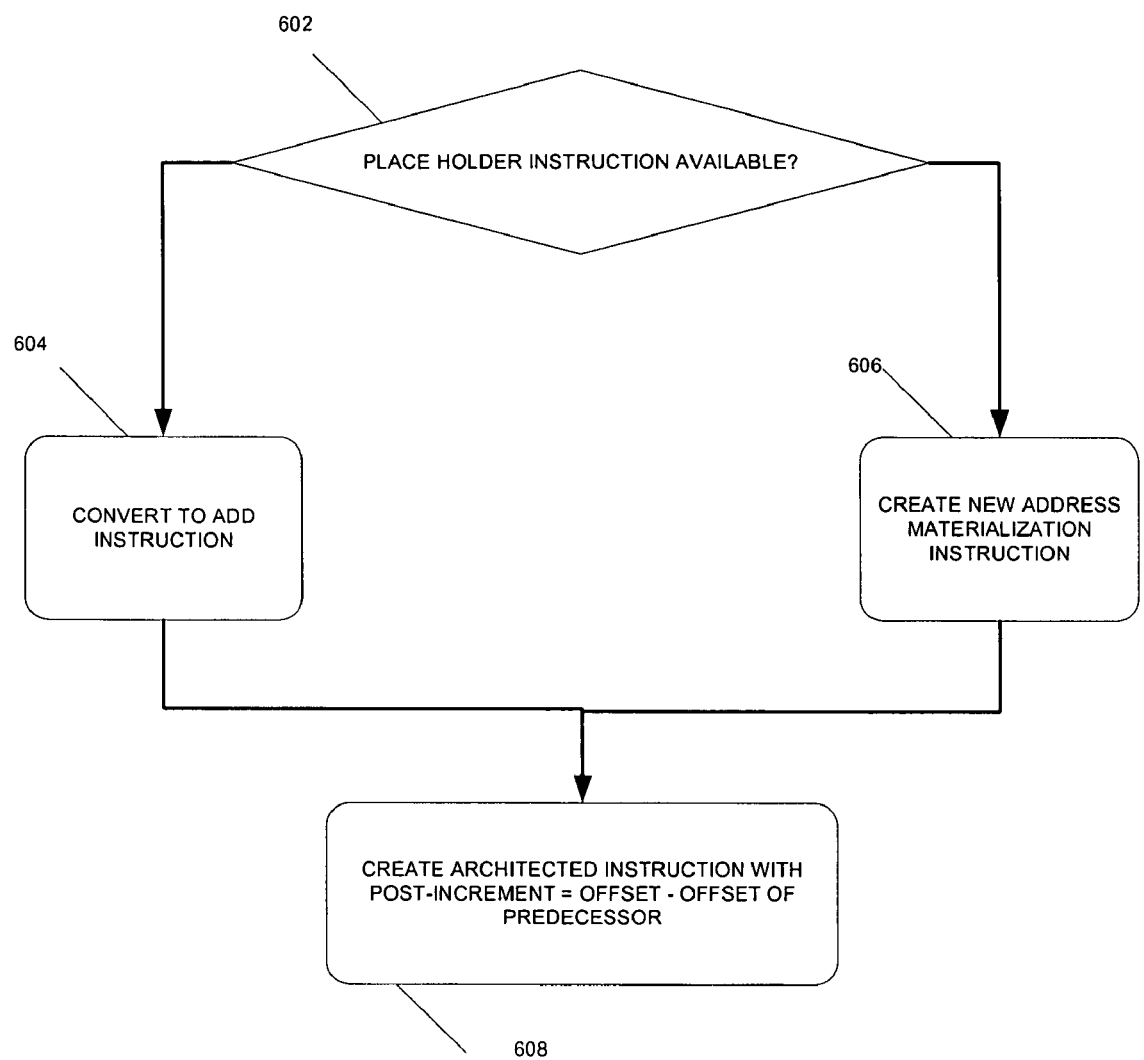
FIG. 6A shows in greater detail, in accordance with an embodiment, the steps for performing the post-increment memory generation.

FIG. 6A shows in greater detail, in accordance with an embodiment, the steps for performing the post-increment memory generation. For each post-increment chain, an inquiry is made to determine whether a place holder instruction is available (step 602). For each chain that has a place holder instruction, the place holder instruction is converted to an appropriate add instruction to initialize the address register for the chain (604). For chains that do not have a place holder instruction, an address materialization instruction is created to initialize the address register (606). Thereafter, instructions in the chain are converted to the architected post-increment instructions (608).

Using the example of FIG. 5C4, the operation of FIG. 6A is illustrated as follows. The result of this operation is shown in FIG. 6B. For chain 1, there exists a place holder instruction "copy u=t". Thus, the place holder instruction is converted into an add instruction to initialize the address register by adding to t the displacement of the first pseudo-memory instruction in the chain (i.e., 4 from instruction 540). Thus, the result is instruction 622 of FIG. 6B.

The offset of the next instruction 624 to be formed is obtained by taking the displacement of its counterpart pseudo-memory instruction 540 and subtracting that from the displacement of the next pseudo-memory instruction in the chain (i.e., instruction 542). The result is instruction 624. Instructions 626 and 628 are formed similarly.

For chain 2, since there is no place holder but both chains share the same base register u, a new address materialization instruction is employed. The new address materialization instruction initializes the new register u1 by adding to t the displacement of the next pseudo-memory instruction in chain 2 (i.e., the offset of instruction 544 or 12). Thus, the result is the address materialization instruction 630. Since there are no instructions in chain 2 after instruction 632, instruction 632 does not post-increment its address.

As can be appreciated from the foregoing, embodiments of the invention automatically generate memory access instructions to post-increment address registers for subsequent memory access instructions without imposing undue constraints on instruction scheduling. Besides reducing the overhead of address computations, this technique also provides a potential reduction in instruction cache misses. Compared to the loop-based solution of the '705 patent, embodiments of the invention are capable of handling general base registers without being limited to handling only memory addresses that are linear functions of loop induction variables. Furthermore, since the '705 patent requires that all potential post-increment candidate dominate the back edge, programs with complex control flows cannot be efficiently handled. Embodiments of the present invention are capable of synthesizing post-increment memory instructions which set up the address for other memory instructions across control flow splits and joint points since the only test required for mating each chain (in addition to the timing-related question of step 504b) is whether the tail of the chain dominates the pseudo-memory instruction being examined.

Furthermore, embodiments of the invention may also be employed to transform a program to an intermediate representation (IR) that can help the compiler easily determine the address difference of two memory locations accessed. This ability provides for opportunities for further optimization, as can be appreciated by those skilled in the art.

While this invention has been described in terms of several embodiments, there are alterations, permutations, and equivalents which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A computer-implemented method for performing compiler straight-line post-increment (SLPI) optimization for memory access instructions of a computer program executed on a processor, comprising:

performing a SLPI preparation on candidate memory access instructions to obtain an intermediate stream of code containing pseudo-memory instructions, each of said candidate memory access instructions representing a non-loop memory access instruction and employing an address that is computed based on the same base register shared by another instruction of said candidate memory access instructions; and performing a SLPI synthesis on said intermediate stream of code to obtain architected memory instructions conforming to a base register auto-incrementing addressing mode, wherein the step of performing the SLPI synthesis includes building post-increment chains of pseudo-memory instructions by placing pseudo-memory instructions that share the same pseudo-memory instruction base into the same post-increment chain, the step of performing the SLPI preparation and the step of performing the SLPI synthesis performed prior to a compiler register allocation phase, the step of performing the SLPI preparation performed prior to a compiler instruction scheduling phase, and the step of performing the SLPI synthesis performed after said compiler instruction scheduling phase.

2. The computer-implemented method of claim 1 wherein each of said pseudo-memory instructions is in the form "address=new_base+displacement" whereby said new_base is different from a base associated with a candidate memory access instruction prior to being converted into one of said pseudo-memory instructions.

3. The computer-implemented method of claim 1 wherein said each of said candidate memory access instructions has the form "address=base+n" whereby said n represents an integer.

4. The computer-implemented method of claim 1 wherein said performing said SLPI preparation includes performing steps a)-e) for a first memory access instruction of said computer program:
   a) determining whether said first memory access instruction is one of said candidate memory access instructions by ascertaining whether said first memory access instruction is in the form "address=base+n" whereby n is an integer;
   b) if said base of said first memory access instruction has not been encountered before during said SLPI preparation, remembering said first memory access instruction as the first occurrence of said base and proceeding to perform said steps a)-e) for another memory access instruction of said computer program;
   c) if said base of said first memory access instruction has been encountered before during said SLPI preparation, ascertaining whether a place holder instruction has been inserted into said intermediate stream of code for said base of said first memory access instruction;
   d) if said place holder instruction for said base of said first memory access instruction has been inserted into said intermediate stream of code, converting said first memory access instruction to a pseudo-memory instruction and proceeding to perform said steps a)-e) for said another memory access instruction of said computer program;
   e) if said place holder instruction for said base of said first memory access instruction has not been inserted into said intermediate stream of code, inserting said place holder instruction for said base of said first memory access instruction into said intermediate stream of code, converting a memory access instruction associated with said first occurrence for said base to said pseudo-memory instruction, converting said first memory access instruction to said pseudo-memory instruction, and proceeding to perform said steps a)-e) for said another memory access instruction of said computer program.

5. The computer-implemented method of claim 1 wherein said SLPI preparation includes inserting a place holder instruction into said intermediate stream of code for each set of candidate memory access instructions that share the same base register.

6. The computer-implemented method of claim 1 wherein said building said post-increment chains includes examining a first pseudo-memory instruction of said pseudo-memory instructions to determine if said first pseudo-memory instruction is matable with an existing post-increment chain.

7. The computer-implemented method of claim 6 wherein said first pseudo-memory instruction is mateable with said existing post-increment chain if a chain tail of said existing post-increment chain dominates said first pseudo-memory instruction and said chain tail and said first pseudo-memory instruction are separated more than an architected latency time specification.

8. The computer-implemented method of claim 6 wherein said first pseudo-memory instruction is mateable with said plurality of existing post-increment chains if chain tails of said plurality of existing post-increment chains collectively dominate said first pseudo-memory instruction.

9. The computer-implemented method of claim 8 further including closing said plurality of existing post-increment chains that collectively dominate said first pseudo-memory instruction except one of said plurality of existing post-increment chains if said first pseudo-memory instruction is mated with said one of said plurality of existing post-increment chains.

10. The computer-implemented method of claim 1 wherein said building said post-increment chains includes examining a first pseudo-memory instruction of said pseudo-memory instructions to determine if said first pseudo-memory instruction is matable with a plurality of existing post-increment chains.

11. The computer-implemented method of claim 1 wherein said building said post-increment chains includes building a branched chain with a first pseudo-memory instruction from an existing post-increment chain.

12. The computer-implemented method of claim 1 wherein said building said post-increment chains includes traversing a topological ordering of said pseudo-memory instructions using a frequency-based approach.

13. The computer-implemented method of claim 1 wherein said SLPI synthesis further includes converting said post-increment chains of pseudo-memory instructions into said architected memory instructions.

14. The computer-implemented method of claim 1 wherein said SLPI synthesis further includes employing both a place holder initialization instruction and an address initialization instruction to perform address calculations for trees that share the same base register.

15. The computer-implemented method of claim 1 wherein said performing said SLPI preparation on said candidate memory access instructions includes performing back substitution on a first candidate memory access instruction of said candidate memory access instructions to ascertain whether said first candidate memory access instruction shares a base resister with another one of said candidate memory access instructions via at least one intermediate base register.

16. An article of manufacture comprising a program storage medium having computer readable code embodied therein, said computer readable code being configured for performing compiler straight-line post-increment (SLPI) optimization for memory access instructions of a computer program, comprising:
   computer readable code for performing SLPI preparation on candidate memory access instructions to obtain an intermediate stream of code containing pseudo-memory instructions, each of said candidate memory access instructions representing a non-loop memory access instruction and employing an address that is computed based on the same base register shared by another instruction of said candidate memory access instructions; and
   computer readable code for performing SLPI synthesis on said intermediate stream of code to obtain architected memory instructions conforming to a base register auto-incrementing addressing mode, wherein the computer readable code for performing the SLPI synthesis includes computer readable code for building post-increment chains of pseudo-memory instructions by placing pseudo-memory instructions that share the same pseudo-memory instruction base into the same post-increment chain, the SLPI preparation and the SLPI synthesis performed prior to a compiler register allocation phase, the SLPI preparation performed prior to a compiler instruction scheduling phase, and the SLPI synthesis performed after said compiler instruction scheduling phase.

17. The article of manufacture of claim 16 wherein each of said pseudo-memory instructions is in the form "address=new_base+displacement" whereby said new_base is different from a base associated with a candidate memory access instruction prior to being converted into one of said pseudo-memory instructions.

18. The article of manufacture of claim 16 wherein said each of said candidate memory access instructions has the form "address=base+n" whereby said n represents an integer.

19. The article of manufacture of claim 16 wherein said computer readable code for performing said SLPI preparation includes computer readable code for performing steps a)-e) for a first memory access instruction of said computer program:

f) determining whether said first memory access instruction is one of said candidate memory access instructions by ascertaining whether said first memory access instruction is in the form "address=base+n" whereby n is an integer;

g) if said base of said first memory access instruction has not been encountered before during said SLPI preparation, remembering said first memory access instruction as the first occurrence of said base and proceeding to perform said steps a)-e) for another memory access instruction of said computer program;

h) if said base of said first memory access instruction has been encountered before during said SLPI preparation, ascertaining whether a place holder instruction has been inserted into said intermediate stream of code for said base of said first memory access instruction;

i) if said place holder instruction for said base of said first memory access instruction has been inserted into said intermediate stream of code, converting said first memory access instruction to a pseudo-memory instruction and proceeding to perform said steps a)-e) for said another memory access instruction of said computer program;

j) if said place holder instruction for said base of said first memory access instruction has not been inserted into said intermediate stream of code, inserting said place holder instruction for said base of said first memory access instruction into said intermediate stream of code, converting a memory access instruction associated with said first occurrence for said base to said pseudo-memory instruction, converting said first memory access instruction to said pseudo-memory instruction, and proceeding to perform said steps a)-e) for said another memory access instruction of said computer program.

20. The article of manufacture of claim 16 wherein said computer-redable code for SLPI preparation includes computer-readable code for inserting a place holder instruction into said intermediate stream of code for each set of candidate memory access instructions that share the same base register.

21. The article of manufacture of claim 16 wherein said building said post-increment chains includes traversing a topological ordering of said pseudo-memory instructions using a frequency-based approach.

22. The article of manufacture of claim 16 wherein said SLPI synthesis further includes converting said post-increment chains of pseudo-memory instructions into said architected memory instructions.

23. A system for optimizing non-loop memory access instructions of a computer program to form architected memory instructions conforming to a base register auto-incrementing addressing mode, comprising:

a processor;

a computer readable medium storing program code executed by the processor, the program code further comprising:

code for obtaining an intermediate stream of code containing pseudo-memory instructions from said non-loop memory access instructions, each of said pseudo-memory instructions sourcing a different base than a respective base of a respective non-loop memory access instruction of said non-loop memory access instructions, said intermediate stream of code including at least one place holder instruction preserving a value associated with a base of a first non-loop memory access instruction even after said first non-loop memory instruction is converted to one of said pseudo-memory instructions; and code for converting said intermediate stream of code using said intermediate stream of code and said at least one place holder instruction to obtain said architected memory instructions, wherein the obtaining an intermediate stream of code and the converting said intermediate stream of code performed prior to a compiler register allocation phase, the obtaining an intermediate stream of code performed prior to a compiler instruction scheduling phase, and the converting said intermediate stream of code performed after said compiler instruction scheduling phase.

* * * * *

UNITED STATES PATENT AND TRADEMARK OFFICE
CERTIFICATE OF CORRECTION

PATENT NO. : 7,594,223 B2  Page 1 of 1
APPLICATION NO. : 11/168111
DATED : September 22, 2009
INVENTOR(S) : Richard E. Hank et al.

It is certified that error appears in the above-identified patent and that said Letters Patent is hereby corrected as shown below:

In column 18, line 5, in Claim 20, delete "computer-redable" and insert -- computer-readable --, therefor.

Signed and Sealed this

Fifteenth Day of June, 2010

David J. Kappos
*Director of the United States Patent and Trademark Office*